United States Patent [19]

Kessler

[11] Patent Number: 4,561,205
[45] Date of Patent: Dec. 31, 1985

[54] FLOAT AND DEPTH GAUGE

[76] Inventor: Theodore P. Kessler, 122 Bridge St., Rancocas, N.J. 08073

[21] Appl. No.: 641,929

[22] Filed: Aug. 17, 1984

Related U.S. Application Data

[63] Continuation of Ser. No. 474,176, Mar. 10, 1983, abandoned.

[51] Int. Cl.⁴ .............................................. A01K 93/00
[52] U.S. Cl. ....................................... 43/4.5; 43/44.87
[58] Field of Search ................................ 43/44.87, 4.5

[56] References Cited

U.S. PATENT DOCUMENTS

| | | | |
|---|---|---|---|
| 852,073 | 4/1907 | Mitchell | 24/230.5 X |
| 1,778,119 | 10/1930 | Neville | 43/44.87 |
| 2,077,184 | 4/1937 | Radar | 43/44.87 |
| 2,208,240 | 7/1940 | Arnesen et al. | 43/44.88 |
| 2,694,878 | 11/1954 | Martens | 43/44.87 X |
| 2,720,014 | 10/1955 | Caldwell | 24/230.5 |
| 2,957,267 | 10/1960 | Dempsey | 43/44.88 |
| 3,480,319 | 11/1969 | Raschke | 24/230.5 |
| 4,047,319 | 9/1977 | Duncan | 43/44.87 |

FOREIGN PATENT DOCUMENTS

| | | | |
|---|---|---|---|
| 13116 | of 1892 | United Kingdom | 43/44.87 |
| 1201028 | 8/1970 | United Kingdom | 43/44.87 |

Primary Examiner—Nicholas P. Godici
Assistant Examiner—C. McKee
Attorney, Agent, or Firm—Kenyon & Kenyon

[57] ABSTRACT

The float is constructed as a hollow elongated cylindrical member with hook shaped elements at the ends to define an aperture for slidably receiving a fishing line. The hook shaped receiving elements permit the float to be readily attached to a fishing line or removed from a fishing line when desired.

The float permits a line to slide through when measuring the depth of a body of water while being clamped when the line is retrieved to mark the depth of the body of water.

11 Claims, 9 Drawing Figures

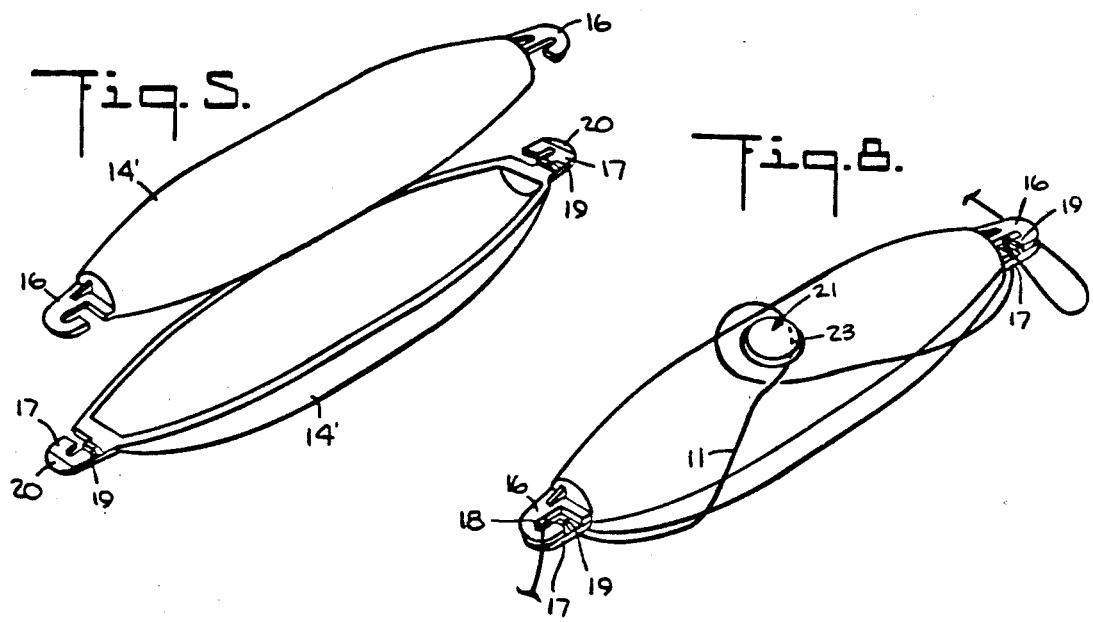
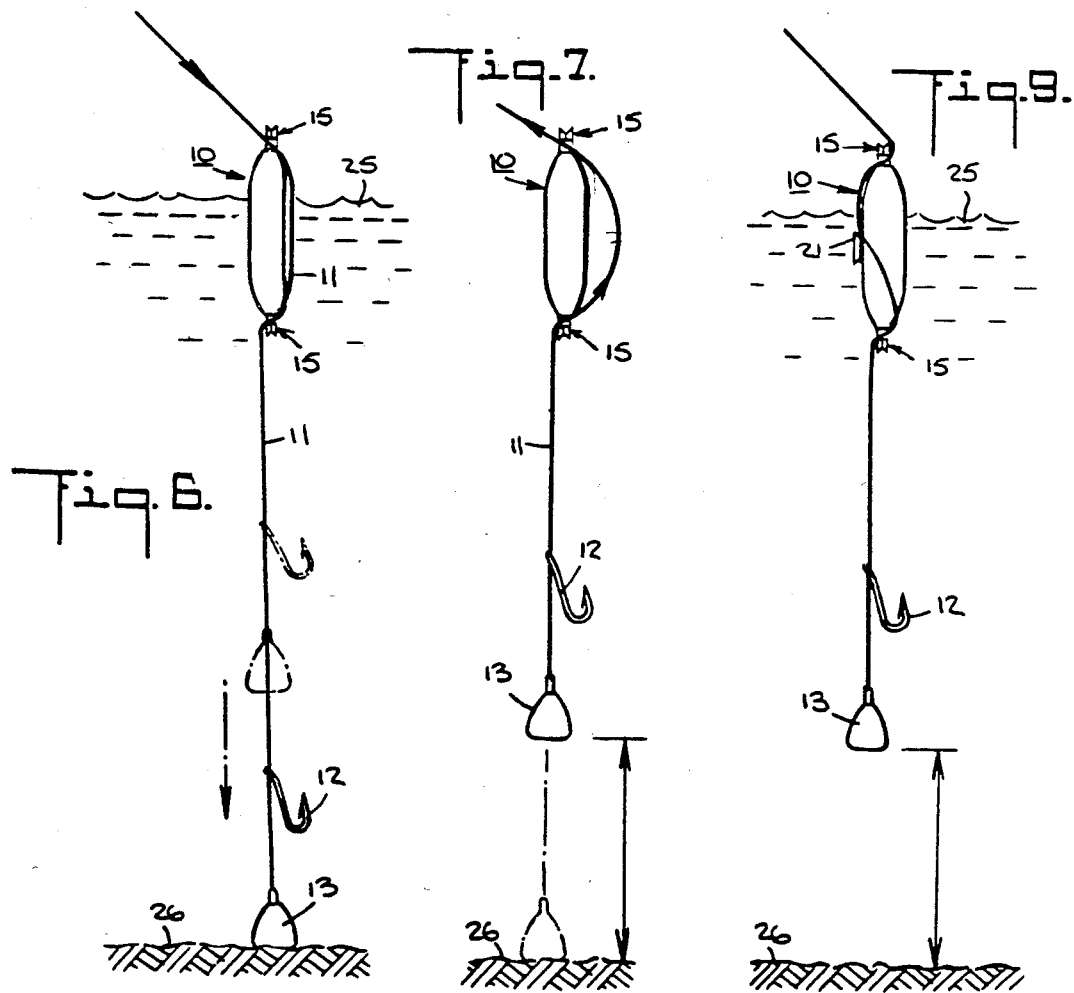

FLOAT AND DEPTH GAUGE

This invention relates to a float and depth gauge. More particularly, this invention relates to a fishing float and depth gauge.

As is known, with some types of fishing, such as in casting a fishing line into a body of water, such as a lake, or ocean, it is frequently desirable to be able to position a hook on the line at a certain level above the bottom of the lake or ocean. To this end, various types of floats have been known which can be secured onto a fishing line at predetermined locations so that when cast into the water, the float will support the hook in a suspended manner above the bottom of the body of water.

Generally, the floats which have been used are of the set-type or of the slip-type. The set-type of float is one which is usually fixed to a fishing line for use at shallow depths of water. One known set-type float has a body provided with a spring biased hook at one or both ends which can be drawn into a recess of the body in order to clamp a fishing line between the hook and body. Other known set-type floats are of similar construction. In each case, the float is fixed to the line and is not intended to move during use. However, these floats usually have a short useful life due to corrosion and/or breakage of the moving parts. Further, these floats require complex manufacturing and assembling techniques. Also, when in use, the spring biased hooks can put an undesired crimp in a fishing line.

It is also impractical for a set float to be used for any thing but shallow depths, for example, if a set float is set for the line to be 10 feet or 15 feet deep it would be virtually impossible to cast with a standard 178 foot or 6 foot spinning pole. Thus, a slip float must be used.

Slip-type floats are generally formed of a float body with a central bore or passage. In such cases, the fishing line is first threaded through the float body and, thereafter, one or more hooks and a sinker are applied to the end of the line. During use, such a float is able to slide along the fishing line until abutting a loop knot, with segment of rubber band or soft string, obstruction, or the like in the line which acts as a stop past which the float will not pass. In the event that the float requires removal, the line is usually cut at a point above the usual tackle and a rethreading of a new float made on the line. This is, of course, wasteful of time and fishing line.

In some cases, small plastic floats have been threaded onto fishing lines to act as slip floats. However, should dirt, grit or beads of water become entrained within the floats, the floats may become jammed on the fishing line. Hence, a fishing hook may become located at a shallower depth than intended.

It has also been found that when a fishing line has been provided with a slip-type of float, one or more hooks and a sinker, accurate casting is impeded by a sliding of the float backwards on the line during flight.

It has also been known to construct floats which can be removed from a line from time to time. For example, a float can be made of two parts which are hinged together so as to sandwich a fishing line therebetween when closed. In this case, use has been made of interfitting ribs at the ends of the two parts of the float in order to clamp the fishing line to the float. In other cases, the floats have been made of two pieces which can dove-tail together in a slide fit relation so as to clamp onto a fishing line. However, in these cases, should the actual depth of the body of water be less than that estimated, the sinker and hook may well rest on the bottom in a slack manner rather than having the hook spaced above the bottom. Likewise, if the depth is greater than that estimated, the hook will be suspended far above the desired location.

Accordingly, it is an object of the invention to be able to accurately place a hook at a submerged point below the surface of a body of water for fishing purposes.

It is another object of the invention to be able to measure the depth of a body of water in a simple manner.

It is another object of the invention to provide a float which can be used for accurately measuring the depth of a body of water or fluid.

It is another object of the invention to provide a fishing float which can be readily attached to or removed from a fishing line.

It is another object of this invention to provide a float with a quick means of attaching or detaching the line from the float regardless if it is being used as a "slip" float or a "set" float.

Briefly, the invention provides a float for use with a fishing line which can be used to position a fishing hook at a predetermined depth as well as to gauge the depth of a body of water or fluid.

The float is constructed of a flotation member and receiving means which are mounted on opposite ends of the member for slidably receiving a fishing line therein in enclosed relation The flotation member is of an elongated cylindrical or oblong shape and is preferably made of light-weight material such as a plastic. In order to enhance the buoyancy of the float, the float is made hollow.

The receiving means at each end of the flotation member is in the form of a pair of flat hook-shaped elements which define an aperture for passage of a fishing line therethrough. The flat elements are disposed in opposed relation such that the aperture is completely enclosed in a peripheral manner. In addition, the elements are resilient to permit passage of a fishing line therebetween in transverse relation. This permits a fishing line to be inserted into the aperture when placing the float on a fishing line. Likewise, the resilient nature of the elements permits the line to pass therebetween for removal of the float from the line.

Each hook-shaped element of the float is also provided with a transverse protuberance which projects into the plane of the adjacent element in order to retain a fishing line within the aperture defined by the elements.

The float may also provided with a securing means intermediate of the ends of the flotation member for securing a fishing line to the member in a fixed position.

When in use, the float is utilized with a fishing line, for example of monofilament construction, to which a sinker and one or more fish hooks have been affixed at one end. In order to apply the float, the fishing line is slid between the flat hook-shaped elements at one end of the float and then rotated 90° in order to snap into the aperture defined by these elements. In like manner, the line is fitted into the aperture defined by the hook shaped elements at the opposite end of the float. At this time, the float, fishing hooks and sinker can then be cast.

During flight of the fishing line, the tension in the fishing line is such as to clamp the line to the float so that the float, fishing hooks and sinker do not impede the casting operation.

When the cast line arrives at the desired location, on the surface of the body of water, the tension in the line relative to the float decreases. Hence, the sinker is able to fall under gravity until reaching the bottom of the body of water while the line slides through the float which is maintained on the surface of the water. After the sinker touches the bottom, the float becomes a measure of the depth of the water at that point. Thereafter, the line is retrieved while again imparting tension to the line in order to clamp the float to the line. Once the line has been retrieved, for example up to the location of the clamped float, a certain length is measured off from this point to establish the depth at which the fishing hook is to be placed for subsequent fishing operation. Next, a rubber band, knot, or other type of tie is placed in the fishing line at this point and the remainder of the line is reeled in. Thereafter, the line is recast, and when the tie slides into abutment with the float, a fishing operation may begin. At this time, the fishing hook will be suspended from the float at a level above the bottom.

The invention also provides a method of determining the depth of a fluid such as a body of water. This method comprises the steps of removably securing a float at opposite ends in slidable manner on a line having a sinker at one end. Thereafter, the line, sinker and float are dropped onto the surface of the body of fluid in order to permit the sinker to fall under gravity until reaching a bottom under the body of fluid while the line slides relative to the float and the float is maintained on the surface of the body of fluid. Thereafter, the line is retrieved while imparting tension to the line to clamp the float to the line at a location indicative of the depth of the body of fluid. Then, the location of the clamped float is marked on the line as a measure of the depth of the body of fluid.

These and other objects and advantages of the invention will become more apparent from the following detailed description taken in conjunction with the accompanying drawings wherein:

FIG. 5 illustrates an exploded view of the float of FIG. 2;

FIG. 6 illustrates a view of a fishing line and float during the measurement of the depth of a body of water;

FIG. 7 illustrates a view of the fishing line and float during a retrieval operation;

FIG. 8 illustrates a view of the fishing line and float of FIG. 4 during fixed securement of the fishing line to the float; and FIG. 9 illustrates a view of a fishing line and the float of FIG. 4 during a fishing operation.

Figure 2:
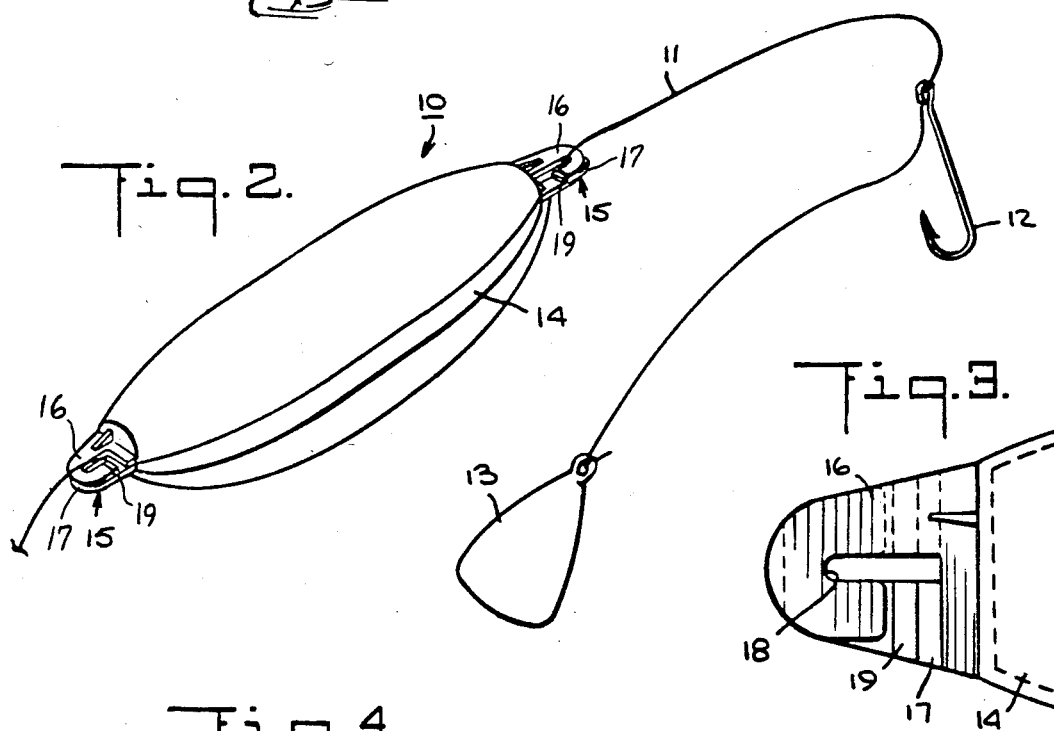
FIG. 2 illustrates a float removably secured on a fishing line having a hook and sinker thereon in accordance with the invention.

Referring to FIG. 2, the float 10 is adapted to be removably secured to a fishing line 11 to which one or more hooks 12 and a sinker 13 have been secured at one end in a conventional manner. The line 11 may be of any suitable type such as a synthetic mono-filament. Likewise, the hook 12 and sinker 13 may be of any conventional structure.

Referring to FIGS. 2 and 5, the float 10 includes a flotation member 14 of hollow elongated cylindrical shape and receiving means 15 mounted on opposite ends of the flotation member 14 for slidably receiving the fishing line 11 in a freely enclosed relation. As indicated in FIG. 5, the flotation member 14 is made of two half pieces 14' which are secured together along a coaxial plane X (see FIG. 4). Each half piece 14' is identical to the other and each has a smooth uninterrupted and unimcumbered outer surface.

The flotation member 14 is of relatively thin-walled thickness so as to be light-weight, particularly for buoyancy. For example, the float 10 may be of various lengths, for example three inches, four inches and six inches. Also, the float 10 may be of light weight such as 0.23 ounces for a three inch float. The float 10 is made of any suitable material, such as polystyrene, styrene, or may be made of various mixtures of polystyrene, such as a high impact polystyrene and a crystal polystyrene.

Figure 3:
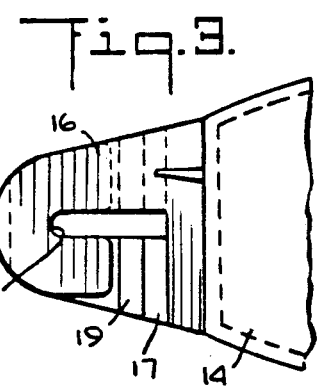
FIG. 3 illustrates an enlarged view of one end of the float and a receiving means at that end in accordance with the invention.
Figure 4:
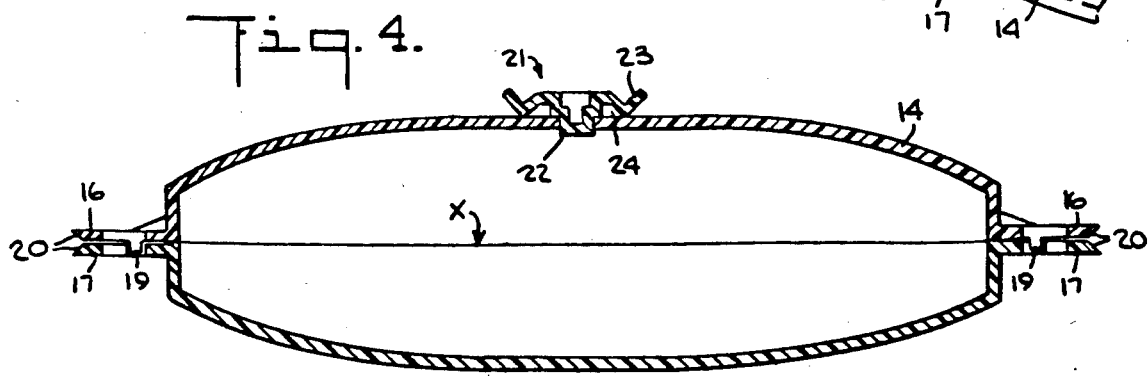
FIG. 4 illustrates a cross-sectional view of a modified float according to the invention

Each receiving means 15 is formed by a pair of flat hook shaped elements 16, 17 which are disposed in opposed relation so as to define an aperture 18 therebetween (see FIG. 3). As indicated in FIG. 4, the hook shaped elements 16, 17 are integral with and extend coaxially from the flotation member 14 on opposite sides of the coaxial plane X. In addition, each element 16, 17 carries a transverse protuberance 19 which projects into the plane of the opposed elements. As indicated in FIG. 3, each protuberance 19 substantially fills the gap between the free end of an element 16, 17 and the base of the elements 16, 17.

As shown in FIG. 4, the outermost ends of the hook shaped elements 16, 17 have a chamfer 20 to define a V-shaped recess therebetween.

Referring to FIGS. 4 and 8, the float 10 may also have a securing means 21 on the flotation member 14 at a point intermediate the ends of the member 14 for securing the fishing line 11 thereto. As indicated in FIG. 4, this securing means includes a central post 22 which protrudes from one half 14' of the flotation member 14 and a cap 23 on the post 22 which defines a recess 24 with the post 22 and the flotation member 14. The post 22 is integrally secured to the flotation member half 14' for example by thermo-welding while the cap 23 is integrally cast with the post 22. As shown in FIG. 4, the cap 23 contacts the member 14 peripherally such that the recess 24 is closed. The recess 24 is also sized to retain one or more windings of the fishing line 11. For example, where the filament line 11 is of relatively large diameter only one winding need be accommodated within the recess 24 in order to secure the float 10 to the line 11 in fixed manner. Where the fishing line 11 is of relatively small diameter, two windings of the line may be accommodated within the recess 24 in order to affix the float 10 to the line 11.

Figure 1:
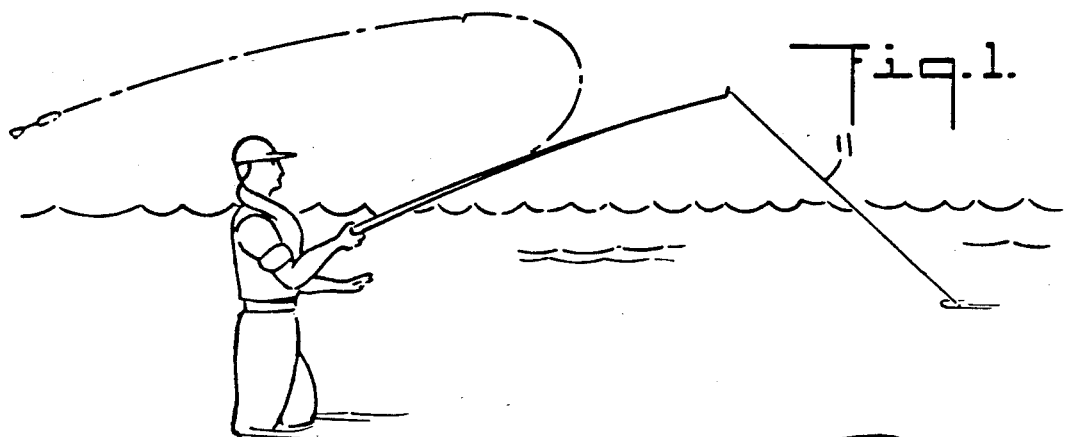
FIG. 1 illustrates a view of a fishing line cast into a body of water via a fishing pole in accordance with the invention.

In order to utilize the float 10 as a depth gauge the float is secured to the fishing line 11, for example, after the hook 12 and sinker 13 have been secured in place. At this time, the fishing line 11 is slid between the resilient hook shaped elements 16, 17 at one end of the floatation member 14 in a transverse manner (parallel to the coaxial plane X). The line 11 is then passed about the free ends of the elements 16, 17 into a plane perpendicular to the coaxial plane X. In this position, the line is free to slide within the elongated aperature 18 formed by the elements 16, 17. A similar operation is then carried out to insert the line within the aperture 18 defined by the elements 16, 17 at the opposite end of the floatation member 14 (see FIG. 2). At this time, the float 10, line 11, hook 12 and sinker 13 can be cast onto the surface of a body of water 25 (see FIG. 1). During flight, the tension in the line 11 is sufficient to clamp the float 10 to the line 11 along the smoothe outer surface of the float 10. This may well be due to the aerodynamic shape of the float 10, the light weight of the float 10 and the frictional forces between the line 11 and float 10. In any event, the float 10 remains in place until arriving at the desired location on the water 25.

Referring to FIG. 6, upon dropping onto the surface of the water 25, the sinker 13 falls under gravity until reaching the bottom 26. At the same time, the line 11 slides through the apertures 18 at the ends of the float 10 while the float 10 remains on the surface of the water 25. In this respect, upon reaching the surface of the water 25, the line relaxes relative to the float 10 so that the float 10 permits the line 11 to slide therethrough.

After the sinker 13 touches the bottom 26 (see FIG. 6), the line 11 can be retrieved. During this time, the line 11 again is tensioned due to the weight of the suspended sinker 13 so that the float 10 is again clamped to the line 11 (see FIG. 7). In this respect, the float 10 is clamped to the line 11 substantially along the entire length of the exterior surface of the float 10 with the shape, light weight and friction forces between the line 11 and float 10 constituting means sufficient to clamp the float 10 to the line 11. The location of the float 10 on the line 11 is thus indicative of the depth of the body of water 25.

After the line 11 has been retrieved up to the location of the clamped float 10, a suitable means 27 such as a tie, rubber band or the like is placed in the line 11 at a point spaced from the float to establish the depth at which the hook 12 is to be located for fishing. That is, this operation permits the fishing hook 12 to be located at a fixed point above the bottom 26 of the water 25. Next, the fishing line 11 is again recast with the float 10 again being held on the line. However, upon impact with the water surface, the line 11 slides through the float 10 up to the location of the tie 27. That is, upon reaching the desired location, the sinker 13 will be suspended above the bottom 26 while the fishing hook 12 is located at the desired fishing height.

In the event that the fishing line is to be used at a different location, the float 10 can again be used as a depth gauge to measure the depth of a different location in the body of water. Of course, any tie 27 which has been formed on the fishing line can be readily removed.

Should it be necessary to fix the float 10 to the fishing line 11 for fishing purposes, the line 11 is simply snapped under the cap 23 of the securing means 21 (FIG. 9). In this respect, the inherent resilience of the cap 23 is sufficient to hold the float 10 on the line 11. If further securement is needed, the line 11 may be wound about the post 22 as indicated in FIG. 8 to form one or more windings.

In the event that the float 10 is to be removed from the fishing line 11, removal can be carried out in a relatively simple manner. For example, a length of the line 11 leading from the float 10 may be doubled over on itself (see FIG. 8) and slid into the aperture 18 in a manner as above. This results in a loop being formed in the line, which loop extends to one side of the float 10. The loop may then be drawn through the aperture 18 so that the float 10 is released from the line 11 at this end. A similar operation is then carried out at the opposite end of the float 10 so that the float is completely removed.

The invention thus provides a float which provides a dual function of acting as a float which can be cast without impeding the casting operation as well as acting as a depth gauge for measuring the depth of a body of water for fluid.

The invention further provides a float of light-weight construction which can be readily removed from a fishing line without having to destroy the line.

The invention further provides a float which can be easily mounted on a fishing line for use in different depths of water.

Since the float has no moving parts, there is no danger of debris or grit clogging the float. Further, the apertures provided by the receiving means at each end of the float are exposed so that each can be readily cleaned should any material lodge therein. Still further, because of the absence of moving parts, such as springs within the float, fabrication can be carried out at low cost and the float may have a long useful life. Finally, the float does not impart any undesirable crimp in the fishing line.

What is claimed is:

1. A float for use with a fishing line comprising
   a flotation member of lightweight material having a hollow elongated cylindrical shape with a smooth uninterrupted unencumbered outer surface; and
   receiving means mounted on opposite ends of said member to define an aperture for slidably receiving a fishing line therein in enclosed relation, said aperture being of a size to prevent passage of a knot placed in the fishing line whereby the depth at which a hook on the fishing line is to be located for fishing can be established;
   said member having an aerodynamic shape and said receiving means being disposed whereby said shape, lightweight and friction forces between a fishing line extending between said means and substantially along the entire length of said outer surface of said member constitute means suffficient to clamp aaid member to the line with tension in the line during retrieving.

2. A float for use with a fishing line comprising
   an elongated hollow flotation member of lightweight material having a pair of half pieces secured together along a coaxial plane to define a smooth uninterrupted unencumbered outer surface; and
   a pair of flat hook-shaped elements mounted on oppposite ends of said member to define an aperture for slidably receiving a fishing line therein in enclosed relation, said aperture being of a size to prevent passage of a knot placed in the fishing line whereby the depth at which a hook on the fishing line is to be located for fishing can be established, said elements being integral with and extending coaxially from said flotation member on opposite sides of said coaxial plane, said elements being resilient to permit passage of a fishing line transversely therebetween, said member having an aerodynamic shape and weight and said elements being disposed to constitute means to clamp said member substantially along the entire length of said member to the fishing line during retrieving with tension in the line.

3. A float as set forth in claim 2 wherein each element has a chamfer at an outermost end to define a V-shaped recess between each pair of elements for receiving a transversely disposed fishing line to be slid between said elements.

4. In combination,
- a fishing line;
- a sinker affixed to said fishing line;
- a fishhook affixed to said fishing line adjacent said sinker; and
- a float removably and slidably mounted on said fishing line, said float having a hollow light weight flotation member of elongated cylindrical shape with a smooth uninterrupted unencumbered outer surface and a pair of flat hook-shaped elements at each end of said member defining an elongated aperture for slidably receiving said fishing line, said aperture being of a size to prevent passage of a knot placed in the fishing line whereby the depth at which a hook on the fishing line is to be located for fishing can be established, said member having an aerodynamic shape and weight and said hook-shaped elements being disposed to constitute means to clamp aaid flotation member substantially along the entire length of said surface to said line during retrieving of said line after casting with tension in said line in order to prevent relative movement between said line and said float.

5. The combination as set forth in claim 4 which further comprises means on said line for abutting one of said hook-shaped elements to establish the depth at which said fishhook is to be located for fishing.

6. A method of determining the depth of a fluid comprising the steps of
- removably securing a float at opposite ends in slidable manner on intermediate points of a line having a sinker at one end;
- dropping the line, sinker and float onto the surface of a body of fluid to permit the sinker to fall under gravity until reaching a bottom under the body of fluid while sliding the line along the exterior surface of the float in unencumbered manner and maintaining the float on said surface;
- thereafter retrieving the line while imparting tension to the line to clamp the float to the line substantially along the entire length of the exterior surface of the float and at a location indicative of the depth of the body of fluid; and
- marking the location of the clamped float on the line.

7. A float for use with a fishing line comprising
- an elongated flotation member; and
- receiving means mounted on opposite ends of said member for slidably receiving a fishing line therein in enclosed relation, each said means including a pair of opposed elements defining an aperture for passage of a fishing line, each said element being hook-shaped and including a transverse protuberance projecting into the plane of the other of said pair of elements to retain a fishing line within said aperture defined by said pair of elements.

8. A float as set forth in claim 7 wherein each element of said pair of elements is resilient to permit passage of a fishing line therebetween in transverse relation.

9. A float as set forth in claim 7 which further comprises a securing means on said member intermediate of said ends for securing a fishing line to said member.

10. A float for use with a fishing line comprising
- an elongated hollow flotation member of lightweight material having a smooth outer surface, a thin walled thickness and a weight of 0.23 ounces for a three inch length; and
- receiving means mounted on opposite ends of said member to define an aperture for slidably receiving a fishing line therein in enclosed relation, said receiving means being disposed to clamp said member to a fishing line extending along said outer elongated surface of said member with tension in the line in order to prevent relative movement between the line and said member under the tension in the line during retrieving.

11. A float as set forth in claim 7 wherein said member has a length of from three inches to six inches.

* * * * *

UNITED STATES PATENT AND TRADEMARK OFFICE
CERTIFICATE OF CORRECTION

PATENT NO.   : 4,561,205
DATED        : December 31, 1985
INVENTOR(S)  : THEODORE P. KESSLER It is certified that error appears in the above-identified patent and that said Letters Patent is hereby corrected as shown below:

Column 1, line 34 change "178" to - 5 1/2-
Column 4, line 12 change "unimcumbered" to -unemcumbered-
Column 4, line 19 cancel "styreme,"
Column 5, line 21 change "26 (See Fig." to -26, (see Fig.-
Column 6, line 42 change "aaid" to -said-
Column 6, line 49 change "opp" to -op-
Column 7, line 21 change "aaid" to -said- Signed and Sealed this First Day of July 1986

[SEAL]

Attest:

DONALD J. QUIGG

Attesting Officer

Commissioner of Patents and Trademarks